Patented Jan. 8, 1946

2,392,682

UNITED STATES PATENT OFFICE 2,392,682

PROCESS FOR DECREASING THE PERMEABILITY OF FABRICATED CARBON SHAPES

Leroy F. Marek, Lexington, Mass., assignor to Arthur D. Little, Inc., a corporation of Massachusetts No Drawing. Application January 11, 1943, Serial No. 472,016

6 Claims. (Cl. 117—46)

This invention relates to a method of decreasing the permeability of fabricated shapes made wholly or in part of amorphous or graphitic carbon, such as tubes, plates, and other shapes and articles used in the construction of chemical apparatus.

Ordinarily such fabricated carbon articles commonly are sufficiently porous to allow gases or vapors to pass through them. Also, when two or more pieces of such articles are assembled together, the joints formed are not always completely tight.

In many situations this permeability is entirely unobjectionable. However, where it is desired to confine a gaseous or vaporous substance at elevated temperatures, such porosity makes the articles unsuitable as construction materials for such purposes. This objection may be overcome to some extent by encasing the articles or shapes, but this procedure is generally ineffective if the gases or vapors are corrosive to them. Efforts have been made, with some success, to produce less porous articles—as by the use of smaller sized particles. This procedure, however, adds considerable cost to the final article and does not entirely eliminate the permeability.

It is also common practice to impregnate fabricated carbon articles with organic binding materials such as Bakelite during the fabrication of the articles. While such impregnation reduces or eliminates the permeability of the articles, they are unsuited for use at elevated temperatures because of the decomposition of the organic impregnant and the resulting destruction of the original article. In general, such impregnated graphite articles cannot be used at temperatures above 200° C. and for long service must be kept below 170° C.

In accordance with the present invention it is possible to produce fabricated articles and shapes which are composed wholly or in part of amorphous or graphitic carbon which are suitable for use for long periods of time at temperatures up to 1000° C. and more, and in which the permeability is considerably reduced, or even substantially eliminated. Furthermore, the method of this invention may also be used to introduce amorphous or graphitic carbon into any small crevices and joints present in assembled apparatus. The resulting articles may consist substantially entirely of carbon; the presence of other substances or elements not being required. The process is economical, and simple to operate.

Briefly stated, the process of this invention consists in heating the fabricated carbon article or shape to be treated, and in passing over and/or through the heated article or shape a stream of a gaseous or vaporized carbon containing compound under normal or positive pressure, which compound is capable of being thermally decomposed in or on the article in such a way as to make the latter impermeable or substantially so. Suitable carbon compounds for this purpose include the strictly organic compounds, and preferably the aliphatic and the aromatic hydrocarbons such as methane, propane, ethylene, acetylene, and benzene; they also include carbon monoxide, either pure or diluted with carbon dioxide, and coke oven gas which is essentially hydrocarbons and carbon monoxide diluted with hydrogen. It is pointed out that organic compounds containing oxygen are less efficient in the utilization of their carbon because a considerable amount of the latter is lost as carbon dioxide and/or carbon monoxide. However, they may still be used to reduce the permeability of the article or shape under treatment.

By maintaining the temperature of the initially permeable fabricated carbon article or shape at a sufficiently high value, or by subsequently heat-treating the article at a suitable temperature after the carbon compound has been decomposed, the deposited carbon can be made amorphous or graphitic in nature as desired. In this manner the general nature of the original fabricated carbon article is not affected and its refractory characteristics are not destroyed but its permeability is greatly reduced.

Penetration of the deposited carbon may be completely through the article, especially if the article is relatively thin and if operating conditions are suitable. In such cases the density of the entire article will approach the true density of graphite (2.2), as compared with an apparent density figure which indicates that about 25% of the volume of the article is voids. For thicker articles and less favorable operating conditions, the carbon deposition may be principally in the voids just within the surface, and upon the surface. But whether the deposit of carbon penetrates the article thoroughly or not, according to the process of this invention the permeability of the articles may be reduced substantially.

The form of the fabricated article to be treated is immaterial so long as the gases or vapors can be passed through it or over it in intimate contact with its surface. If it is in the form of a tube, the gases or vapors are conveniently led into the heated tube under atmospheric or slight positive pressure and caused to flow through the walls, or in close and more or less penetrating contact therewith. Plates or other solid shapes may be treated by arranging them in a suitable apparatus so that the gases or vapors may be caused to flow from one side or face through to the other side. If it is desired, the apparatus may be assembled, and the gases or vapors then passed through the carbon parts, thus sealing the joints as well as those parts. Any other suitable arrangement and procedure may be utilized as desired under the particular conditions involved.

The positive pressure referred to is ordinarily attained by supplying the gases or vapors to the article under superatmospheric pressure, and leading the gaseous products of treatment away under normal pressure. However, it may be attained by supplying the gases or vapors at any pressure—at, above, or below atmospheric, while leading away the gaseous products of treatment at a pressure lower than that under which the original gases or vapors are supplied.

Ordinarily it will be most expeditious to heat both the article and the treating gases or vapors to the treating temperature; however, this may be modified if desired. For example, the treating gases or vapors may be heated and passed through the unheated article which is thereby heated to the desired temperature. It is also preferable to bleed gases from the decomposition zone so that hydrogen does not accumulate in the zone to give resulting gas mixtures too low in carbon.

It is also particularly advantageous to have the surface which contacts with the hot gases clean and free from loose particles.

The following examples, which are to be considered as illustrative rather than limiting, will serve to describe the invention more fully:

Example I

Into a porous graphite tube heated to about 1450° F. and plugged at one end, benzene vapor was led at the other end under a pressure of 2.5 inches of Hg in excess of atmospheric pressure. The pressure on the outside of the tube was atmospheric. After 3.45 hours of this treatment, the tube was allowed to cool, and was examined for gas permeability.

The permeability was determined by the following method: A constant pressure of nitrogen in excess of atmospheric, was maintained in the inside of the tube, which was sheathed with a metal container in such a manner that the gas which permeated through the tube was collected in the container and drawn off through a small outlet in the latter and measured in terms of cubic feet per hour per square foot at atmospheric pressure. Several runs at various pressures were made on the tube before treatment and several after treatment. This method can also be reversed by maintaining a gas pressure in the container and collecting and measuring the gas that permeates to the inside of the tube.

Three determinations under various pressures were made on thus treated tube and on a similar untreated tube. All runs were made at 68° F. The designation "Pressure of $N_2$ p. s. i." indicates the pressure of nitrogen in pounds per square inch above atmospheric. "K" is the measure of permeability in cubic feet per hour per square foot per pound of pressure above atmospheric. These definitions apply to this and the following examples:

| Blank | | | Treated | | |
|---|---|---|---|---|---|
| Pressure of $N_2$, p. s. i. | Cu. ft./(hr.) (sq. ft.) | K | Pressure of $N_2$, p. s. i. | Cu. ft./(hr.) (sq. ft.) | K |
| .271 | .463 | 1.70 | .368 | .125 | .340 |
| .513 | .955 | 1.86 | .736 | .276 | .374 |
| .946 | 1.79 | 1.89 | .982 | .367 | .374 |

The permeability of the treated tube was therefore reduced to the order of about one-fifth of its original permeability, as indicated by a comparison of the values of K.

Example II

Using a porous graphite tube similar to that used in Example I, propane was introduced instead of benzene. The temperature of the gas and tube were between 1200° F. and 1560° F.; the pressure used was 2.0" of Hg in excess of atmospheric; and the operation was carried on for 2.0 hours.

Three determinations under various pressures were made as described in Example I. All runs were 68° F.

| Blank | | | Treated | | |
|---|---|---|---|---|---|
| Pressure of $N_2$, p. s. i. | Cu. ft./(hr.) (sq. ft.) | K | Pressure of $N_2$, p. s. i. | Cu. ft./(hr.) (sq. ft.) | K |
| .250 | .551 | 2.2 | .455 | .201 | .441 |
| .680 | 1.57 | 2.30 | 1.13 | .530 | .470 |
| .885 | 2.125 | 2.40 | 1.93 | .962 | .498 |

This treated tube also showed reduction in permeability to about one-fifth of its original value.

Example III

Using a porous graphite tube similar to that used in the previous experiments, carbon monoxide under a superatmospheric pressure of 2.5" Hg was introduced as the gas at a temperature of about 1315° F.–1500° F. for 5.25 hours.

The tube was then allowed to cool, and upon examination, as described in Example I, the gas permeability, at 68° F., was found to be as follows:

| Blank | | | Treated | | |
|---|---|---|---|---|---|
| Pressure of $N_2$, p. s. i. | Cu. ft./(hr.) (sq. ft.) | K | Pressure of $N_2$, p. s. i. | Cu. ft./(hr.) (sq. ft.) | K |
| .455 | 1.41 | 3.10 | .456 | .762 | 1.67 |
| .694 | 2.25 | 3.25 | .948 | 1.73 | 1.83 |
| 1.13 | 4.04 | 3.57 | 1.44 | 3.02 | 2.10 |

This tube also showed reduction of permeability, although not to so great an extent as in the preceding examples since it is in the order of slightly less than one-half.

Example IV

Using a porous graphite tube similar to that used in the previous examples, coke oven gas was used having the following composition:

|  | Percent by volume |
|---|---|
| $CO_2$ | 1.4 |
| Illum | 3.2 |
| CO | 5.4 |
| $O_2$ | 0.4 |
| $H_2$ | 54.6 |
| $CH_4$ | 28.7 |
| $C_2H_6$ | 0.8 |
| $N_2$ | 4.9 |
| $H_2S$ | 0.6 |

A superatmospheric pressure of .625" of Hg and a temperature of 1770° F.–1835° F. was used. Upon examination for gas permeability at 68° F., as described in Example I, the following results were obtained:

| Blank | | | Treated | | |
|---|---|---|---|---|---|
| Pressure of $N_2$, p. s. i. | Cu. ft./(hr.) (sq. ft.) | K | Pressure of $N_2$, p. s. i. | Cu. ft./(hr.) (sq. ft.) | K |
| .23 | 3.54 | 15.4 | .456 | .0178 | .039 |
| .455 | 8.92 | 19.6 | .948 | .0572 | .060 |
| | | | 1.44 | .0953 | .066 |

This treatment reduced the permeability of the tube to the order of 1/325 to 1/400. The tube in this last example was wire brushed and rinsed with $CCl_4$ to remove all dust particles before treatment. This treatment, as can be seen from the example, greatly aids the reduction of permeability.

A catalyst may be used to promote the speed of cracking of the carbon containing compounds. For example, the fabricated carbon article may be treated with a dilute aqueous solution of $NiNO_3$, then drained and dried, and then subjected to the treatment herein described. While a gas-tight product can be obtained in this way, the tendency of the catalyst may be to cause too rapid cracking, with the result that the carbon is deposited on, or near, the surface. Such a procedure, though not preferred, is suitable in some instances.

Another convenient way by which a catalyst, of which Ni or Fe is an example, may be deposited in the pores of the article, is by the interstitial decomposition of a gaseous compound of the metal, for example, a carbonyl compound.

If it is desired, this process may be repeated several times at different pressures and with different gases and with different dilutions of these gases. Such procedure will serve to reduce the permeability further.

Having thus described the present invention so that others skilled in the art may be able to understand and practice the same, I state that what I desire to secure by Letters Patent is defined in what is claimed.

What is claimed is:

1. The process of decreasing the gas permeability of the wall of a tubular carbon article comprising the steps of heating such a wall to a temperature above the decomposition temperature of a gaseous carbon compound capable of being thermally decomposed to deposit carbon, bringing such a compound into the interior of said article under pressure exceeding that existing on the outer surface of said article and thereby passing said compound into the wall of said article and depositing carbon between the inner and outer surfaces of said wall.

2. The process according to claim 1 wherein the carbon compound is methane.

3. The process according to claim 1 wherein the carbon compound is carbon monoxide.

4. The process according to claim 1 wherein the carbon compound is coke oven gas.

5. The process according to claim 1 wherein the pressure exerted on the carbon compound within the said article is between about 0.25" of mercury and about 2.5" of mercury.

6. The process according to claim 1 in which the article is heat treated after the deposition of carbon within its walls to graphitize the deposited carbon.

LEROY F. MAREK.